(12) United States Patent
Chen et al.

(10) Patent No.: US 9,919,410 B2
(45) Date of Patent: Mar. 20, 2018

(54) METHOD FOR CONTROLLING AN ELECTRICAL TOOL

(71) Applicant: CHERVON INTELLECTUAL PROPERTY LIMITED, Road Town (VG)

(72) Inventors: Wu Chen, Nanjing (CN); Liang Chen, Nanjing (CN)

(73) Assignee: Chervon (HK) Limited, Wanchai (HK)

(*) Notice: Subject to any disclaimer, the term of this patent is extended or adjusted under 35 U.S.C. 154(b) by 443 days.

(21) Appl. No.: 14/747,614

(22) Filed: Jun. 23, 2015

(65) Prior Publication Data

US 2015/0375386 A1   Dec. 31, 2015

(30) Foreign Application Priority Data

Jun. 26, 2014   (CN) .......................... 2014 1 0295693

(51) Int. Cl.
| | |
|---|---|
| *B25F 5/00* | (2006.01) |
| *H02K 7/14* | (2006.01) |
| *B25B 21/00* | (2006.01) |
| *H02P 25/032* | (2016.01) |

(52) U.S. Cl.
CPC .............. *B25F 5/00* (2013.01); *B25B 21/002* (2013.01); *H02K 7/145* (2013.01); *H02P 25/032* (2016.02)

(58) Field of Classification Search
CPC ........ B25F 5/00; H02P 25/032; B25B 21/002; H02K 7/145
USPC ........................................ 173/2, 4, 170, 171
See application file for complete search history.

(56) References Cited

U.S. PATENT DOCUMENTS

| | | | | |
|---|---|---|---|---|
| 5,355,751 A | * | 10/1994 | Specht | .................... B25B 17/00 81/57.14 |
| 2008/0127711 A1 | * | 6/2008 | Farag | .................. B25B 23/1425 73/1.11 |
| 2012/0132043 A1 | * | 5/2012 | Chen | .................. B25B 23/1425 81/479 |

\* cited by examiner

*Primary Examiner* — Nathaniel Chukwurah
(74) *Attorney, Agent, or Firm* — Greenberg Traurig, LLP (57) ABSTRACT

A method for controlling an electrical tool having a motor, a transmission mechanism, a control device, and a function member. The motor drives the function member to move in a reciprocating manner via the transmission mechanism. The function member has a standard position and the control device controls the motor. The control device at least has an associated position sensor capable of detecting a position of the function member. The method for controlling the electrical tool includes at least a reset movement process that is used to reset the function member to the standard position after the function member completes more than one cycle of reciprocating movement.

20 Claims, 7 Drawing Sheets

FIGURE 7

METHOD FOR CONTROLLING AN ELECTRICAL TOOL

BACKGROUND

The following generally relates to a method for controlling an electrical tool.

Electrical tools, such as an electrical torsion spanner, electrical trimmer, and electrical pruner, perform specific operations in a way that a motor drives a function member to move in a reciprocating manner. As far as this type of electrical tool is concerned, the tool is expected to reset automatically when the tool function is not accomplished for the sake of security purposes and the user's convenient operation. Take the electrical torsion spanner 100 shown in FIG. 1 as an example, the electrical torsion spanner 100 is an open-ended spanner. When using this tool, the user hopes that the spanner is placed in a state shown in FIG. 1 upon initial use each time. However, after power off, the electrical torsion spanner 100 is usually in a random position as shown in FIG. 2 and therefore causes great inconvenience to the user's use thereof.

SUMMARY

A method for controlling an electrical tool is hereinafter described. The electrical tool comprises a function member for performing a function of the electrical tool, a motor for driving the function member to move in a reciprocating manner, and a detection device for detecting whether the function member passes a preset position. The method comprises judging whether the function member passes the preset position for the first time, enabling a rotation speed of the motor to be reduced after the function member passes the preset position for the first time, judging whether the function member passes the preset position again, and enabling the rotation speed of the motor to be reduced again after the function member passes the preset position again.

Furthermore, the motor is preferably in a first drive state for a first preset length of time after the function member passes the preset position for the first time and the motor is switched from the first drive state to a second drive state before the function member passes the preset position again.

Furthermore, a minimum rotation speed of the motor in the first drive state is preferably higher than a maximum rotation speed of the motor in the second drive state.

Furthermore, a maximum rotation speed of the motor in the first drive state is preferably higher than a maximum rotation speed of the motor in the second drive state.

Furthermore, when the function member passes the preset position for the first time, time may start to be counted, and when the length of time reaches the first preset length of time, the motor is preferably switched from the first drive state to the second drive state.

Furthermore, before the function member passes the preset position for the first time, the drive state of the motor is preferably defined as the first drive state.

Furthermore, after the function member passes the preset position again, the motor is preferably switched from the second drive state to a third drive state, and the motor is operated in the third drive state for a second preset length of time.

Furthermore, a minimum rotation speed of the motor in the second drive state is preferably higher than a maximum rotation speed of the motor in the third drive state.

Furthermore, a maximum rotation speed of the motor in the second drive state is preferably higher than a maximum rotation speed of the motor in the third drive state.

Furthermore, when the function member passes the preset position again, time can start to be counted, and when the length of time reaches the second preset length of time, the motor is preferably switched from the second drive state to the third drive state.

Another method for controlling the electrical comprises judging whether the function member passes the preset position for the first time, reducing an electrical current flowing through the motor after the function member passes the preset position for the first time, judging whether the function member passes the preset position again, and reducing the electrical current flowing through the motor again after the function member passes the preset position again.

Furthermore, the motor is preferably in a first drive state for a preset length of time after the function member passes the preset position for the first time and the motor is preferably switched from the first drive state to a second drive state before the function member passes the preset position again.

Furthermore, a minimum electrical current value of the motor in the first drive state is preferably higher than a maximum electrical current value of the motor in the second drive state.

Furthermore, a maximum electrical current value of the motor in the first drive state is preferably higher than a maximum electrical current value of the motor in the second drive state.

Furthermore, when the function member passes the preset position for the first time, time may start to be counted, and when the length of time reaches the first preset length of time, the motor is preferably switched from the first drive state to the second drive state.

Furthermore, before the function member passes the preset position for the first time, the drive state of the motor is preferably defined as the first drive state.

Furthermore, after the function member passes the preset position again, the motor is preferably switched from the second drive state to a third drive state, and the motor is operated in the third drive state for a second preset length of time.

Furthermore, a minimum electrical current value of the motor in the second drive state is preferably higher than a maximum electrical current value of the motor in the third drive state.

Furthermore, a maximum electrical current value of the motor in the second drive state is preferably higher than a maximum electrical current value of the motor in the third drive state.

Furthermore, when the function member passes the preset position again, time may start to be counted, and when the length of time reaches the second preset length of time, the motor is preferably switched from the second drive state to the third drive state.

More specifically, the electrical tool further comprises a controlling device, and the method for controlling the electrical tool at least comprises the following controlling steps:

a. triggering activation of reset control by a user's operation or a control signal;

b. driving the motor to run in a first drive state by the controlling device;

c. judging whether a detection point passes a detection scope, and performing the next step if yes, and returning to the preceding step if no;

d. driving the motor to run in the first drive state by the controlling device, and counting time by the controlling device simultaneously;

e. judging whether the length of time counted by the controlling device satisfies a first preset length of time, and performing the next step if yes, and returning to the preceding step if no;

f. driving the motor to run in a second drive state by the controlling device;

g. judging whether the detection point passes an extremity detection position, and performing the next step if yes, and returning to the preceding step if no;

h. driving the motor to run in a third drive state by the controlling device, and counting time by the controlling device simultaneously; and i. judging whether the length of time counted by the controlling device satisfies a second preset length of time, and performing the next step if yes, and returning to the preceding step if no.

Furthermore, a pre-reset process, an intermediate process and a reset process preferably uses a PMW signal with different duty cycles to drive the motor.

With the above controlling method, the function member is enabled to reset to a standard position after more than one cycle of operation.

DETAILED DESCRIPTION

Figure 1:
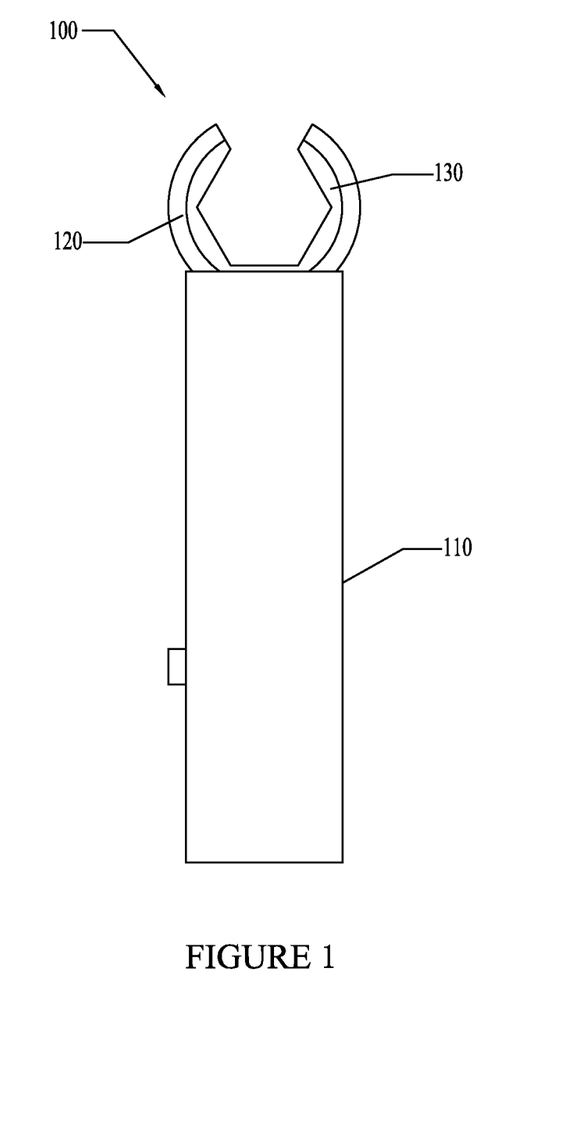
FIG. 1 is a schematic view of an electrical torsion spanner preferably applicable in a controlling method according to the description which follows when a function member thereof is in a standard position.
Figure 2:
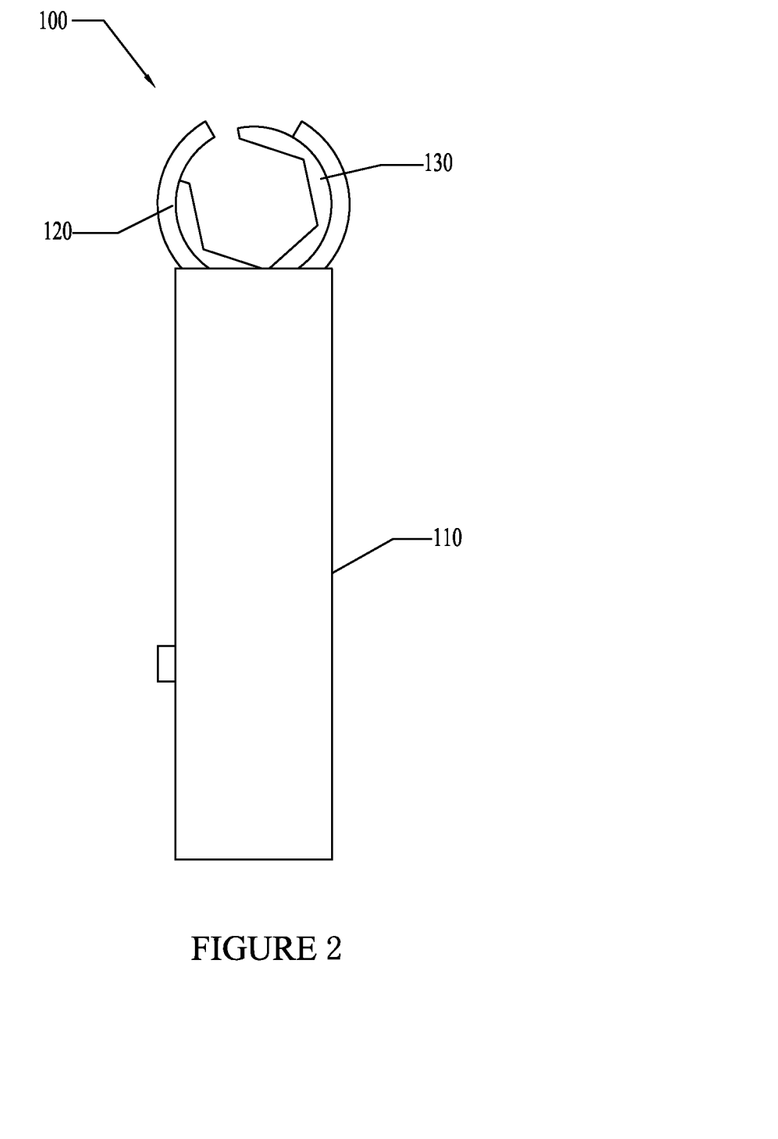
FIG. 2 is a schematic view of the electrical torsion spanner shown in FIG. 1 when the function member is in another position.
Figure 3:
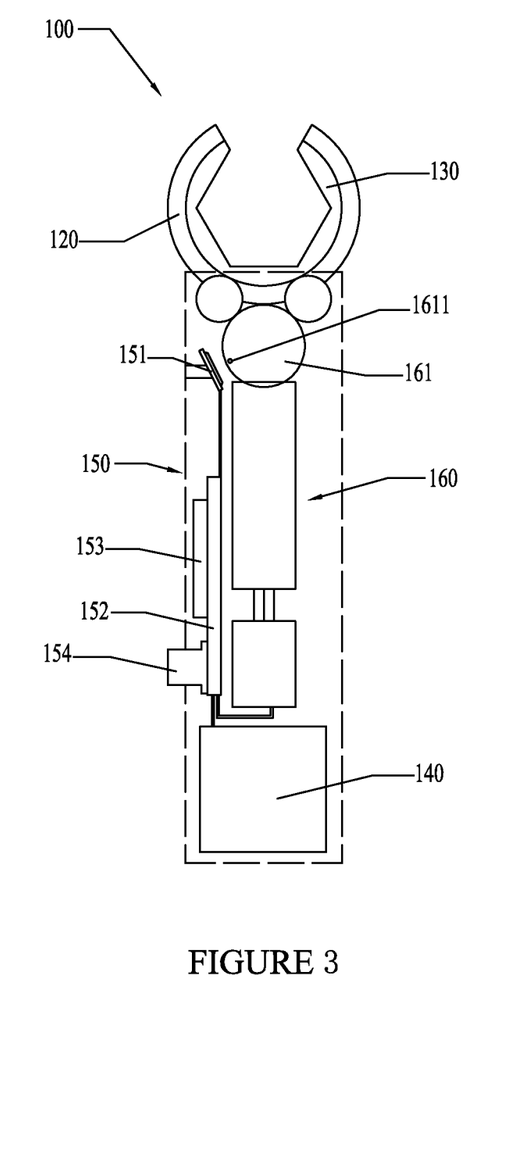
FIG. 3 is a structural schematic view of the electrical torsion spanner shown in FIG. 1.

Referring to FIG. 1 through FIG. 3, an electrical torsion spanner 100 is an electrical tool, to which a controlling method according to the description which follows is preferably applicable. Certainly, the controlling method according to the description which follows is also applicable to an electrical tool such as an electrical trimmer or an electrical pruner.

As shown in FIG. 1 through FIG. 3, the electrical torsion spanner 100 comprises a housing 110, a bracket 120 and an open wheel 130.

The housing 110 is designed in a handle shape, and receives a motor 140 and a controlling device 150 therein. The bracket 120 is fixedly disposed at one end of the housing 110, and the open wheel 130, as a function member capable of outputting torsion, is rotatably disposed in the bracket 120. Both the bracket 120 and the open wheel 130 are provided with an opening and, when there are openings completely flush, the open wheel 130 is at a standard position. The controlling device 150 comprises a position sensor 151, a control circuit board 152, an MCU chip 153 and a reset button 154. The control circuit board 152 supplies power for the position sensor 151 and the MCU chip 153, and a user may trigger a reset control via the reset button 154. Certainly, it is also possible to not require an activation of the reset button 154, but enable the MCU chip 153 to automatically trigger the reset control after sensing that the user completes operation. Noticeably, this requires the control circuit board 152, after the user loosens the operation switch to power off the motor 140, to delay cutoff of power to enable the MCU chip 153 to have enough time to judge and control the position of the function member.

The electrical torsion spanner 100 further comprises a transmission mechanism 160 which can transfer power outputted by the motor 140 to the open wheel 130. The transmission mechanism 160 is at least provided with one transmission member 161 capable of moving in unison with the open wheel 130. In order to enable the position sensor 151 to detect the position of the open wheel 130 in the housing 110, the transmission member 161 is provided with a detection point 1611 that can be detected by the position sensor 151, and the position sensor 151 may detect the position of the open wheel 130 by detecting the position of the transmission member 161. Certainly, the detection point 1611 may also be directly disposed on the open wheel 130 as the function member.

Figure 4:
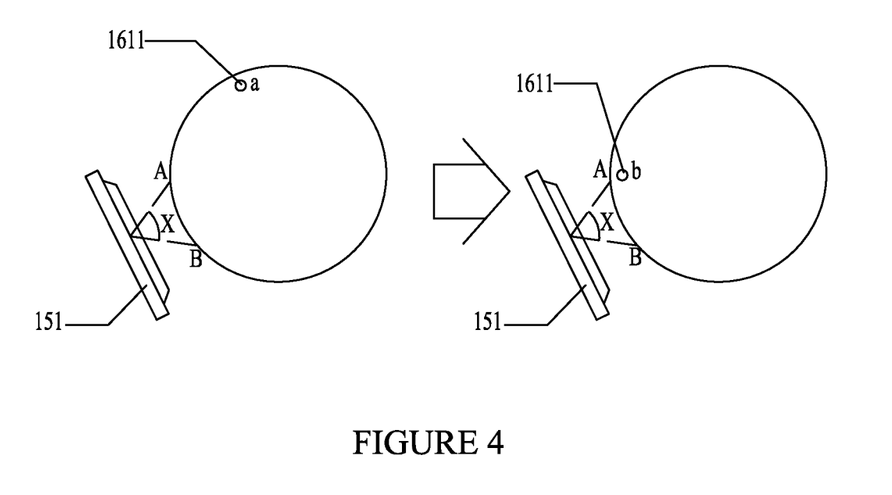
FIG. 4 is a schematic view showing a process of a detection point on a transmission member in FIG. 3 moving from an initial position a to a position b in a scope of detection.

In addition, it should be noted that the position sensor 151 is generally an area induction having a certain detection scope X as shown in FIG. 4. Certainly, the higher the sensor's precision is, the smaller the detection scope X is, and different signals can be transmitted according to different positions of the detection point 1611 in the detection scope X.

The method for controlling the electrical tool according to the present invention generally comprises a reset movement process enabling the function member to reset to the standard position after completing more than one cycle of reciprocating movement.

An advantage of so doing lies in that during the reset movement process, detection of the function member at the standard position for the first time by the position sensor 151 is regarded as a reference for subsequent control so that such reset control can enable the function member to reset when it rotates to any position.

Specifically speaking, the controlling method comprises judging whether the function member passes a preset position for the first time, and enabling a rotation speed of the motor to be reduced after the function member passes the preset position for the first time; and judging whether the function member passes the preset position again, and enabling the rotation speed of the motor to be reduced again after the function member passes the preset position again.

More specifically, the rotation speed of the motor may be controlled by controlling electrical current of the motor, and the rotation speed of the motor is generally in direct proportion to the electrical current of the motor, thus the rotation speed of the motor may be reduced by lowering the electrical current of the motor.

Furthermore, in order to control the electrical current of the motor, a semiconductor switch for controlling turn-on and turn-off of a power supply circuit is provided in a power supply loop which powers the motor, and the semiconductor switch can, controlled by a drive circuit, enable the power supply circuit in a turn-on or turn-off state, thus the semiconductor switch may be controlled to control a duty cycle of the turn-on of the power supply circuit to control the electrical current of the motor.

As a preferred solution, after the function member passes the preset position for the first time, the motor is enabled in a first drive state in a first preset length of time; and before the function member passes the preset position again, the motor is switched from the first drive state to a second drive state.

When the motor is in the first drive state, the power supply circuit employs a higher duty cycle so that a larger electrical current passes through the motor so as to obtain a higher rotation speed. When the motor is in the second drive state, the power supply circuit employs a lower duty cycle so that a smaller electrical current passes through the motor so as to obtain a lower rotation speed.

Correspondingly, a current value and a duty cycle value of the motor may employ a similar correspondence relationship.

In order to achieve effective deceleration, as a preferred solution, a maximum rotation speed of the motor in the first drive state is higher than a maximum rotation speed of the motor in the second drive state; more preferably, to make a deceleration effect from the first drive state to the second drive state more effective, a minimum rotation speed of the motor in the first drive state is higher than a maximum rotation speed of the motor in the second drive state.

In order to control the time of the first drive state, as a preferred solution, when the function member passes the preset position for the first time, time begins to be counted, and when the length of time reaches the first preset length of time, the motor is switched from the first drive state to the second drive state.

As a preferred solution, to make the function member reset as quickly as possible, the function member may be enabled to continue to maintain the original drive state for a period of time upon passing the preset position for the first time, i.e., before the function member passes the preset position for the first time, the last drive state of the motor is defined as the first drive state and the drive state is maintained for a certain period of time.

To achieve final reset, as a preferred solution, after the function member passes the preset position again, the motor is switched from the second drive state to a third drive state, and the motor is enabled to run a second preset length of time in the third drive state.

The second drive state functions to enable the motor to transit smoothly from a state of an initial high speed of the motor upon braking to a state of a lower speed needed by motor reset control.

The motor rotates at a minimum rotation speed for the second preset length of time in the third drive state. Since a starting point of time upon switching to the third drive state is certain and a running state of the motor at the starting point of time is also certain, a stopping position thereof due to action of inertia after the duration of the third driving satisfies the second preset length of time is also certain. The function member can move to the preset position due to the action of inertia after completion of control by setting the first drive state, the second drive state and the third drive state, as well as the first preset length of time and the second preset length of time.

As a preferred solution, in order to achieve effective deceleration, a maximum rotation speed of the motor in the second drive state is higher than a maximum rotation speed of the motor in the third drive state. Furthermore, a minimum rotation speed of the motor in the second drive state is higher than the maximum rotation speed of the motor in the third drive state.

Correspondingly, a current value and a duty cycle value of the motor may employ a similar correspondence relationship.

In addition, time count may begin when the function member passes the preset position again, and the motor is switched from the second drive state to the third drive state when the length of time reaches the second preset length of time.

The movement process of the function member controlled by the above controlling method may be defined as a reset movement process. The reset movement process comprises: a pre-reset process wherein the function member is controlled to move in a first movement mode to a standard position and then still moves in the first movement mode in a preset length of time thereafter, an intermediate process wherein the function member is controlled to move in a second movement mode after the completion of the pre-reset process, and a reset process wherein the function member is controlled to move in a third movement mode after the completion of the intermediate process.

The pre-reset process is a first control process after the activation of the reset movement process, and it comprises two major procedures: one is to enable the function member to move as quickly as possible to a position that can be sensed by the position sensor 151 and enable subsequent control to have a definite starting benchmark, and the second is to trigger a time count when the position sensor 151 senses the detection point 1611 and enable the function member to still move in the first movement mode in the first preset length of time. Noticeably, it is desired that during the pre-reset process, the time count begins when the function member can be controlled to move to the standard position, and maintain movement in the first movement mode for a preset length of time. However, since the position sensor 151 is usually in an area induction manner, it is difficult for the position sensor to accurately sense a location of the standard position. Therefore, as a more preferred solution, the time count begins when the function member moves to the detection point 1611 at a position that can be sensed by the position sensor 151, and the function member maintains movement in the first movement manner for the first preset length of time. According to actual situations, the starting point of the time count of the first preset length of time is earlier than the starting point of the time count of the preset length of time. Therefore, the first preset length of time may be set greater than the preset length of time counted starting from the standard position.

In addition, the position that can be sensed by the position sensor 151 may be directly set at the standard position such that the first preset length of time may be equal to the preset length of time counted starting from the standard position. As such, it is advantageous that upon completion of the reset, the position sensor 151 can detect whether the reset is done finally so that a position sensor 151 or a probe is saved.

After completion of the pre-reset process, i.e., after the time count of the first preset length of time is satisfied, the intermediate process starts, wherein the function member is controlled to move in a second movement mode. Since a condition for triggering the time count of the first preset length of time is that the position sensor 151 detects the detection point 1611, and during this period, the movement mode of the function member remains invariable, a position of the starting point of the intermediate process control is certain. The control of the intermediate process is a portion of travel for enabling the function member to move from a fixed starting point in a certain movement mode to a fixed finishing point to make the function member to complete the reset. In order to make the travel of movement of the function member in the intermediate process fixed, the control motor 140 enables the function member to keep moving in the second movement mode in the intermediate process. In the intermediate process, when the detection point 1611 is detected again, i.e., when the detection point 1611 enters the detection scope X, the intermediate process ends. When the intermediate process ends, the reset process starts.

In the reset process, the function member moves in a third movement mode until it stops at the standard position. Upon completion of the intermediate process, the control device 150 starts the time count. When the counted length of time satisfies the second preset length of time, the reset process ends. As a preferred solution, in the reset process, the motor 140 powers off, and the whole transmission mechanism 160 and the function member both move by virtue of inertia, whereupon as a starting point of the inertia movement is fixed, the finishing point of the intermediate process, a finishing point of the inertia movement is also fixed under the same condition. Therefore, by properly setting the finishing point of the intermediate process, the function member may exactly stop at the standard position when the inertia movement of the reset process stops.

As a preferred solution, the pre-reset process, the intermediate process and the reset process use a PMW signal with different duty cycles to drive the motor 140 so that the function member has different movement modes in the three processes. More specifically, in the first movement mode, the function member makes uniform speed or accelerated movement; in the second movement mode and the third movement mode, the function member makes decelerated movement; a maximum movement speed of the function member in the first movement mode is higher than a maximum movement speed of the function member in the second movement mode; the maximum movement speed of the function member in the second movement mode is higher than a maximum movement speed of the function member in the third movement mode.

The method for controlling the electrical tool according to the present invention is further introduced in combination with the electrical torsion spanner 100 and a specific control step. In the present invention, in the detection scope X are arranged two extremity detection positions A and B on a boundary of the detection scope X and a standard detection position located therebetween. When the function member is at a standard position, the detection point 1611 is at the standard detection position of the position sensor 151, and when the detection point 1611 moves in the detection scope X, the position sensor 151 generates position signals one-to-one corresponding to positions according to changes of the position of the detection point 1611; when the detection point 1611 is at the extremity detection positions A and B, the position sensor 151 generates a boundary signal; and when the detection point 1611 is at the standard detection position, the position sensor 151 generates a centering signal.

Referring to FIG. 4, after completion of one operation, the motor 140 powers off, and the transmission member 161 stops rotation so that the detection point 1611 is randomly at a position, whereupon the reset control is activated and specifically comprises the following steps:

S01: triggering activation of the reset control by a user's operation or a control signal.

S02: driving the motor 140 to run in a first drive state by the controlling device 50.

S03: Judging whether the detection point 1611 passes the detection scope X, and performing the next step if yes, and returning to the preceding step if no.

Referring to FIG. 4, before the detection point 1611 reaches position b that can be detected by the position sensor 151 from the position a where the detection point stops randomly, steps S02 and S03 are always performed repeatedly. This phase is a first phase of the pre-reset process, which enables the detection point 1611 to turn to position b as quickly as possible to obtain a time benchmark for subsequent control. Once the position sensor 151 detects the detection point 1611, the subsequent control process starts.

Noticeably, since the transmission mechanism 160 is fixed, the mode of the drive motor 140 decides the movement mode of the function member, i.e., the drive state of the motor 140 corresponds to the movement mode of the function member. Specifically, when the motor 140 is driven to run in the first drive state, the transmission member 161 drives the open wheel 130 to move in the first movement mode.

Figure 5:
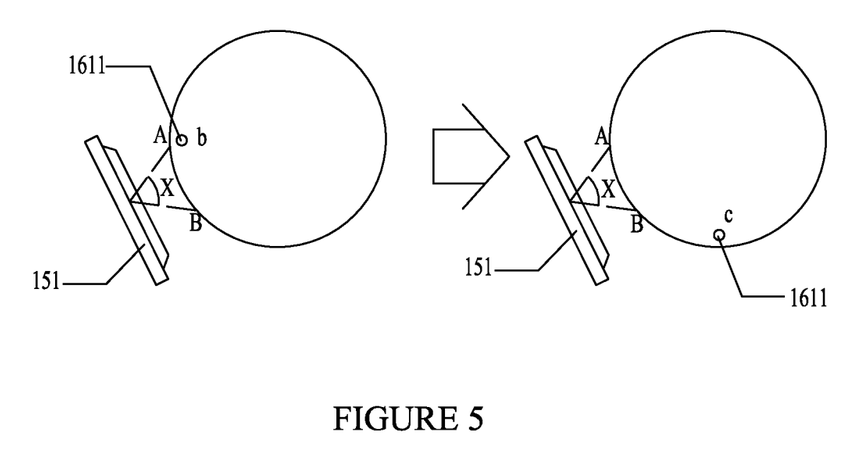
FIG. 5 is a schematic view showing a process of the transmission member moving from the position b in FIG. 4 to a position c when a first preset length of time is satisfied.

S04: The control device 150 retains the first drive state to drive the motor 140 to run, and meanwhile the control device 150 performs the time count.

S05: Judging whether the length of time counted by the control device 150 satisfies the first preset length of time, and performing the next step if yes, and returning to the preceding step if no.

Referring to FIG. 5, before the first preset length of time is satisfied, the control device 150 retains the first drive state to drive the motor 140 until the first preset length of time is satisfied, whereupon the detection point 1611 moves to a position c. As known from the preceding description, the pre-reset process ends at this time, and furthermore, the position of the detection point 1611 or the position of the opening of the open wheel 130 upon completion of the pre-reset process is also certain. Therefore, the subsequent control process may accurately control the motor 140 by excluding an influence of the randomness so as to achieve the reset.

As a preferred solution, in order to quicken the reset process, the first drive state of the motor 140 may be performed with a larger duty cycle so that the detection point 1611 quickly rotates to the position that can be detected and then completes a certain reset travel.

Figure 6:
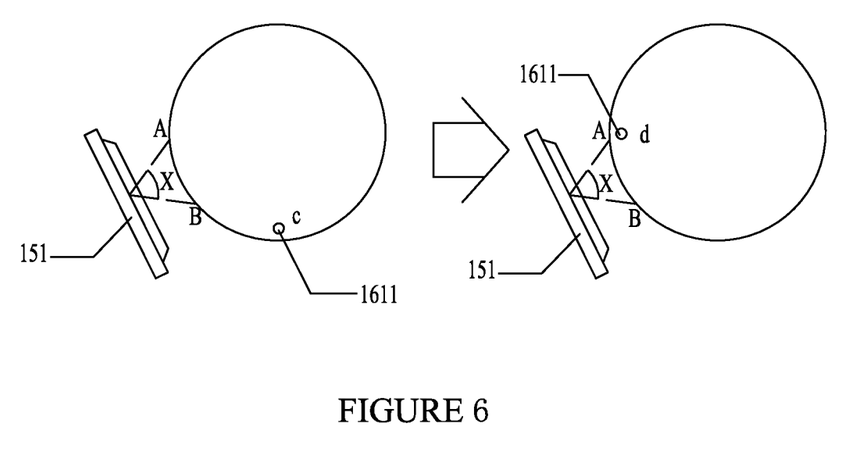
FIG. 6 is a schematic view showing a process of the transmission member further moving from the position c in FIG. 5 to a position d in the scope of detection.

S06: The control device 150 changes to drive the motor 140 to run in the second drive state.

S07: Judging whether the detection point 1611 passes the extremity detection position A, and performing the next step if yes, and returning to the preceding step if no.

Referring to FIG. 6, in the procedure, the detection point 1611 moves from the position c to the position d; in the procedure, the motor 140 is driven in the second drive state with a smaller duty cycle so that both the transmission member 161 and the open wheel 130 begin to decelerate to prepare for braking for the final reset.

Here a counter-clockwise movement of the transmission member 161 or function member is taken as an example. When the transmission member 161 or function member moves clockwise, this step may be set as judging whether the detection point 1611 passes the extremity detection position B, so that the function member can complete automatic reset regardless of clockwise movement or counter-clockwise movement.

Figure 7:
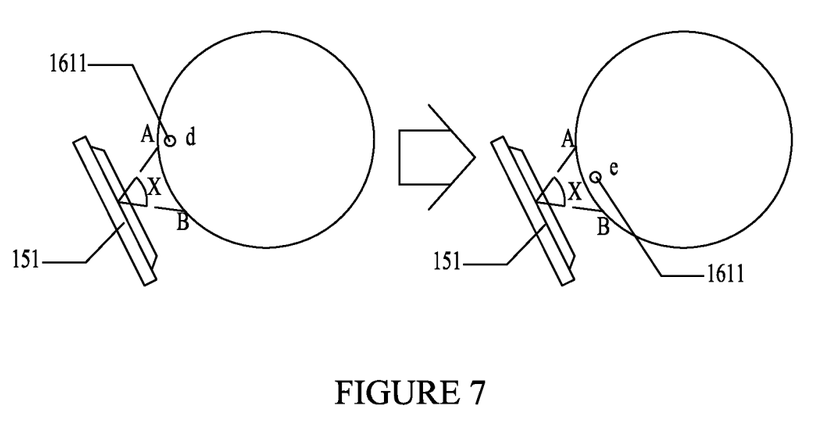
FIG. 7 is a schematic view showing a process of the transmission member moving from the position d in FIG. 6 to a standard detection position.

S08: The control device 150 changes to drive the motor 140 to run in the third drive state, and meanwhile the control device 150 performs the time count.

S09: Judging whether the length of time counted by the control device 150 satisfies the second preset length of time, and performing the next step if yes, and returning to the preceding step if no.

S10: Ending the control.

As shown in FIG. 7, in this procedure, the motor 140 is driven in the third drive state to further decelerate. When the counted length of time satisfies the second preset length of time, its speed is certain, whereupon control is stopped and the motor 140 is no longer driven, the detection point 1611 continues to move a certain distance due to action of inertia and then stops at a position e which may be controlled and represented, and the positional relationship between the transmission member 161 and the open wheel 130 is set properly to enable the open wheel 130 at the standard position at this time.

Noticeably, a first half of the procedure of the detection point 161 moving from the position d to the position e is driven, and a second half of the procedure is completed due to action of inertia.

The above illustrates and describes basic principles, main features and advantages of the present invention. Those skilled in the art should appreciate that the above embodiments do not limit the present invention in any form. Technical solutions obtained in a way of equivalent substitution or equivalent variations all fall within the scope of the present invention as set forth in the claims which follow.

What is claimed is:

1. A method for controlling an electrical tool comprising a function member for performing a function of the electrical tool, a motor for driving the function member to move in a reciprocating manner, and a detection device for detecting whether the function member passes a preset position, the method comprising:
    judging whether the function member passes a preset position for a first time;
    enabling a rotation speed of the motor to be reduced after the function member passes the preset position for the first time;
    judging whether the function member passes the preset position again; and
    enabling the rotation speed of the motor to be reduced again after the function member passes the preset position again.

2. The method according to claim 1, wherein the motor is in a first drive state for a first preset length of time after the function member passes the preset position for the first time and the motor is switched from the first drive state to a second drive state before the function member passes the preset position again.

3. The method according to claim 2, wherein a minimum rotation speed of the motor in the first drive state is higher than a maximum rotation speed of the motor in the second drive state.

4. The method according to claim 2, wherein a maximum rotation speed of the motor in the first drive state is higher than a maximum rotation speed of the motor in the second drive state.

5. The method according to claim 2, wherein when the function member passes the preset position for the first time, a length of time begins to be counted, and when the length of time reaches a first preset length of time, the motor is switched from the first drive state to the second drive state.

6. The method according to claim 2, wherein before the function member passes the preset position for the first time, the drive state of the motor is defined as the first drive state.

7. The method according to claim 2, wherein after the function member passes the preset position again, the motor is switched from the second drive state to a third drive state, and the motor is operated in the third drive state for a second preset length of time.

8. The method according to claim 7, wherein a minimum rotation speed of the motor in the second drive state is higher than a maximum rotation speed of the motor in the third drive state.

9. The method according to claim 7, wherein a maximum rotation speed of the motor in the second drive state is higher than a maximum rotation speed of the motor in the third drive state.

10. The method according to claim 7, wherein when the function member passes the preset position again, a length of time begins to be counted, and when the length of time reaches the second preset length of time, the motor is switched from the second drive state to the third drive state.

11. A method for controlling an electrical tool comprising a function member for performing a function of the electrical tool, a motor for driving the function member to move in a reciprocating manner, and a detection device for detecting whether the function member passes a preset position, the method comprising:
    judging whether the function member passes a preset position for a first time;
    reducing an electrical current flowing through the motor after the function member passes the preset position for the first time;
    judging whether the function member passes the preset position again; and
    reducing the electrical current flowing through the motor again after the function member passes the preset position again.

12. The method according to claim 11, wherein the motor is in a first drive state for a preset length of time after the function member passes the preset position for the first time and the motor is switched from the first drive state to a second drive state before the function member passes the preset position again.

13. The method according to claim 12, wherein a minimum electrical current value of the motor in the first drive state is higher than a maximum electrical current value of the motor in the second drive state.

14. The method according to claim 12, wherein a maximum electrical current value of the motor in the first drive state is higher than a maximum electrical current value of the motor in the second drive state.

15. The method according to claim 12, wherein when the function member passes the preset position for the first time, a length of time begins to be counted, and when the length of time reaches a first preset length of time, the motor is switched from the first drive state to the second drive state.

16. The method according to claim 12, wherein before the function member passes the preset position for the first time, the drive state of the motor is defined as the first drive state.

17. The method according to claim 12, wherein after the function member passes the preset position again, the motor is switched from the second drive state to a third drive state, and the motor is operated in the third drive state for a second preset length of time.

18. The method according to claim 17, wherein a minimum electrical current value of the motor in the second drive state is higher than a maximum electrical current value of the motor in the third drive state.

19. The method according to claim 17, wherein a maximum electrical current value of the motor in the second drive state is higher than a maximum electrical current value of the motor in the third drive state.

20. The method according to claim 17, wherein when the function member passes the preset position again, a length of time begins to be counted, and when the length of time reaches a second preset length of time, the motor is switched from the second drive state to the third drive state.

\* \* \* \* \*